United States Patent [19]
Randell et al.

[11] Patent Number: 5,378,559
[45] Date of Patent: Jan. 3, 1995

[54] PHOSPHATE ESTER ADDITIVE TO ALKALINE CELLS TO REDUCE GASSING

[75] Inventors: Christopher F. Randell, Durham City; David Kilby, Durham, both of United Kingdom

[73] Assignee: Eveready Battery Company, Inc., St. Louis, Mo.

[21] Appl. No.: 155,676

[22] Filed: Nov. 22, 1993

[51] Int. Cl.6 .................. H01M 4/36; H01M 10/24
[52] U.S. Cl. .................................. 429/206; 429/224; 429/229; 429/59
[58] Field of Search ............... 429/206, 224, 229–231, 429/57–59, 245

[56] References Cited

U.S. PATENT DOCUMENTS

| | | | |
|---|---|---|---|
| 3,847,669 | 11/1974 | Paterniti | 136/30 |
| 4,195,120 | 3/1980 | Rossler et al. | 429/50 |
| 4,500,614 | 2/1985 | Nagamine et al. | 429/206 |
| 4,585,716 | 4/1986 | Chalilpoyil et al. | 429/206 |
| 4,606,984 | 8/1986 | Vignaud | 429/212 |
| 4,777,100 | 10/1988 | Chalilpoyil et al. | 429/59 |
| 4,781,999 | 11/1988 | Vignaud | 429/214 |
| 4,857,424 | 8/1989 | Larsen et al. | 429/206 |
| 5,168,018 | 12/1992 | Yoshizawa et al. | 429/206 X |
| 5,308,374 | 5/1994 | Yoshizawa et al. | 429/229 X |

*Primary Examiner*—Anthony Skapars
*Attorney, Agent, or Firm*—Robert W. Welsh

[57] ABSTRACT

Alkaline zinc cells employing a brass anode current collection and little or no mercury and wherein a specific phosphate ester is added, preferably to the anode, to reduce gassing attributed to the brass anode current collector.

20 Claims, No Drawings

PHOSPHATE ESTER ADDITIVE TO ALKALINE CELLS TO REDUCE GASSING

FIELD OF THE INVENTION

The invention relates to alkaline cells employing a brass anode current collector and containing a specific phosphate ester to reduce gassing from the brass collector when the cell contains little or no mercury.

BACKGROUND OF THE INVENTION

Alkaline cells are well known in the art and generally employ a zinc anode, manganese dioxide as the cathode with an aqueous solution of potassium hydroxide for the electrolyte. These cells are readily available commercially for industrial and home applications. An improved type of alkaline cell has been disclosed by Cegasa International, a Spanish company. This cell, referred to as an air-assisted cell, employs zinc as the anode and manganese dioxide as the cathode with an aqueous solution of potassium hydroxide as the electrolyte. This cell is designed so that the positive electrode containing the manganese dioxide ($MnO_2$) is supported about is periphery and along its full length in the cell by a perforated ribbed air distribution grid. The bottom or negative end of the cell has an insulating support which allows air to enter the cell and pass up along the outside of the supported positive electrode. When the cell is initially put into a circuit, the electrochemical reaction depends primarily upon the presence of the manganese dioxide cathode. As the reaction progresses, and the manganese dioxide cathode is electrochemically reduced, air within the cell reoxidizes and recharges the manganese dioxide. Thus an air-assisted cell is designed to use oxygen in the air to "recharge" manganese dioxide in the cathode. This "recharging" of the manganese dioxide means that the fixed quantity of manganese dioxide in the cathode can be discharged and then recharged numerous times.

Standard alkaline batteries and air-assisted alkaline batteries have traditionally been made with mercury in the anode. Mercury helped to prevent gassing by raising the hydrogen overvoltage. Due to concerns about the environment, battery manufacturers are designing alkaline batteries with little or no mercury. As the percentage of mercury in the cells has been reduced, problems with leakage and decreased shelf life have become apparent. The reduction or elimination of mercury has led to service and shelf storage problems because gassing in and the expansion of the anode in the anode compartment have forced electrolyte to flow from the anode compartment into the cathode compartment. As electrolyte moves from the anode into the cathode, ionic conductivity in the anode decreases and the cell cannot discharge efficiently. If the anode compartment continues to gas and expand, the electrolyte from the anode could be driven into the cathode and may essentially be driven through the seal and out of the cell.

U.S. Pat. No. 4,857,424 discloses an alkaline zinc-manganese dioxide electrochemical cell containing a small amount of an organosiliconate additive as a means for reducing the amount of mercury used in the zinc amalgam. The organosiliconates added to the anode are film forming organic wetting agents and can be used in mercury containing anoidic zinc gels containing other gas suppressors.

U.S. Pat. No. 4,195,120 discloses that hydrogen evolution in cells having zinc anodes is reduced or eliminated by incorporating in the cell a surfactant which is a complex phosphate ester of a surfactant of the ethylene oxide-adduct type. This surfactant is added in such a manner that, directly or upon wetting of the anode by the electrolyte, there is an adsorption of surfactant on the surface of the zinc anode material, whereby hydrogen evolution is inhibited. The surfactant is desirably present in the cell in an amount of from 0.001% to 5% by weight of the zinc component of the cell. Useful surfactants disclosed in this patent are organic phosphate esters. Such surfactants will generally be a monoester or a diester having the following formula:

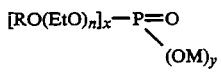

where x+y=3;

M=hydrogen, ammonia, amino, or an alkali or alkaline earth metal; and

R=phenyl or alkyl or alkylaryl of 6–28 carbon atoms. Specific useful phosphate ester surfactants include materials which can be identified by their commercial designation as GAFAC RE610, GAFAC RA600 and KLEARFAC AA-040.

U.S. Pat. No. 4,847,669 discloses the use of an ethylene oxide polymer in the cell in an amount sufficient to reduce the rate of reaction between the zinc and the alkaline electrolyte, thereby permitting a significant reduction in the proportion of mercury needed to achieve satisfactory shelf life and thereby provides a means for eliminating some of the ecologically objectionable mercury from the cells and replacing it with ecologically innocuous materials.

U.S. Pat. No. 4,781,999 discloses a method of stabilizing a primary electrochemical cell which includes at least one reactive anode made of a metal selected from the group constituted by zinc, aluminum, and magnesium such that the method consists in adding a stabilizer to said electrode, the stabilizer concentration lying in the range 0,001% to 1% by weight of electrode metal, and the stabilizer comprising at least one alkyl and polyethoxylalcohol sulfide satisfying the following formula:

$$R-S-(CH_2)_2-(O-CH_2-CH_2-)_n-OH \qquad (1)$$

in which:

R is an alkyl radical which may optionally be branched, an aryl radical, or an alklaryl radical; and n lies in the range 2 to 100.

U.S. Pat. No. 4,606,984 discloses a process for stabilizing a primary electrochemical generator comprising at least one reactive anode made from a metal chosen from the group comprising zinc, aluminum and magnesium, characterized in that to said electrode is added a percentage of 0.01% to 1% by weight with respect to the metal, of at least one perfluorated organic compound of the ethoxylated fluoroalcohol type. A preferred perfluorated compound disclosed has the formula:

$$C_nF_{2n+1}-(CH_2)_p-(CH_2CH_2O)_q-OH$$

in which

N is between 4 and 20, preferably between 6 and 8;
p is between 1 and 10 and is preferably close to 2; and
q is between 3 and 40, preferably between 10 and 12.

A single compound may be used corresponding to the above formula or else a mixture of two or more compounds corresponding to this formula may be used. It is also possible to use a non saturated perfluorated organic compound of formula:

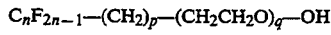

in which n, p and q have the same meaning as the above formula.

Even with the reduction of mercury in alkaline cells, it has been found that when using a brass anode current collector in the cell, undesirable gas may be formed due to the presence of the brass anode current collection. Many different types of brass materials have been used in alkaline cells with some being better than others. However, the use of a brass anode current collector in alkaline cells lead to the formation of undesirable gas when the cell contains little or no mercury.

It is an object of the present invention to provide an additive for alkaline cells employing little or no mercury and a brass anode current collector.

It is another object of the present invention to provide an additive to an alkaline cell employing little or no mercury and a brass anode current collector in which said additive is a specific phosphate ester.

These objects, together with other and further objects of the invention which appear from the following description, are accomplished by the invention of the alkaline zinc-manganese dioxide electrochemical cells described herein.

SUMMARY OF THE INVENTION

The invention relates to a galvanic cell comprising a conductive container; a cathode electrode in electronic contact with the container and said container functioning as the first terminal of the cell; a separator disposed within said cathode electrode to form a cavity within said cathode electrode, said separator permitting ion transport; a zinc containing anode electrode disposed within said cavity and electronically insulated from the cathode electrode by said separator; a brass anode current collector in electronic contact with said anode electrode and in electronic contact to an external terminal of the cell in which said external terminal functions as the second terminal of the cell; and wherein said cell contains a phosphate ester having the formula:

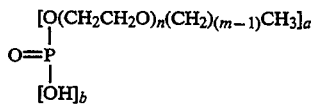

wherein
b is greater than 1.9;
a+b=3;
n is 3;
m is 13;
and the ratio of the phosphate ester monoester to the diester is greater than 9.

As stated above, many additions have been employed to lower the gassing in alkaline zinc cells due to the present of zinc. It has been found that the use of a brass anode current collector can also contribute to gassing within a zinc alkaline cell. The use of different brass anode current collectors also have to be considered since the composition of different brass collectors can effect the amount of gas formed.

Corrosion additives can also be added to an alkaline zinc cell to aid in reducing gassing due to the zinc. Suitable additives would be indium, bismuth, lead, gallium, and mixtures thereof. The preferred additive would be 0.001 to 1.0 weight percent indium, bismuth, or lead, with indium being the most preferred. The weight percent of the additive is based on the weight of the zinc.

The preferred method of adding the phosphate ester to the cell is by mixing the zinc containing component of the cell with the phosphate ester. Another method would be to mix the phosphite ester after the addition of zinc, gel and the electrolyte. Although many phosphate esters are known in the art, it is only a specific phosphate ester that has been observed to reduce gassing in an alkaline zinc cell employing a brass anode current collector. Phosphate esters may be monoester so that in the above formula a=3 and b=0, or diester in which a=2 and b=3, or triester in which a=0 and b=3. In the subject invention, only the phosphate esters containing a ratio of monoester to diester of greater that 9 would provide the necessary composition of the phosphate ester to effectively reduce gassing in an alkaline zinc cell using a brass anode current collector. The preferred amount of phosphate ester to be added to the cell should be between 0.001 and 1.0 percent by weight of the zinc and more preferably between 0.01 and 0.2 percent by weight of the zinc.

The preferred electrolyte for use in the cell of this invention is potassium hydroxide flakes or liquid rather than pellets and could contain from 0.05 to 6 percent by weight of zinc oxide, preferably about 3 percent by weight zinc oxide. A suitable separator would be made of cellophane.

The electrochemical cells of this invention can comprise an alkaline electrolyte, a cathode and an anode arranged in a sealed container in a manner effective to provide electrochemical energy, i.e., when the cell is placed in a circuit, electrochemical energy is provided to the circuit. The cells have terminals of opposite polarity. One terminal is in contact with the cathode and the other is in contact with the anode. The cell is sealed in a manner effective to contain the cell components in the container under conditions of transport and use. The cell construction can include a cupped metallic can, suitably constructed of steel, nickel and other metal and can be nickel plated in whole or in part. A tubular cathode containing the active cathode material and conductor can be lined on the inner surface of the can, and a separator suitably made of a non-woven cellulosic or polymer fiber, preferably cellophane, can be lined on the inner surface of the tubular cathode. In this construction, the can is in contact with the cathode and this is the cathode terminal.

An anode made of a mixture of active anode material, electrolyte, optionally an electrolyte-swellable binder such as polyacrylic acid can be enclosed within the separator. A brass current collector member, such as in the form of a pin or arcuate shaped member is inserted into the anode. The cell is closed with a cover and sealed. The cover is in contact with the anode current collector member and is the anode terminal of the cell. Any conventional seal can be employed. It is desirable that the cell construction not have a venting means that would vent due to the normal pressure generated in the cell during a normal discharge.

The electrolyte used in this invention is an aqueous alkaline solution, such as potassium hydroxide or sodium hydroxide. The concentration of the solution can be any concentration that provides for ionic conductivity. Typically, in the assembled cell the concentration preferably ranges from about 30% to about 40%.

The cathode used in this invention is comprised of a metal oxide as the active cathode component. Examples include manganese dioxide and silver oxide. Preferred is manganese dioxide, and more preferred is electrolytic manganese dioxide (EMD). ENID, a widely available commercial product, is prepared by plating manganese dioxide from a manganese sulphate plating solution onto an electrode. The deposited manganese dioxide is subsequently removed from the electrode and recovered.

In addition to the metal oxide, the cathode further comprises a compound that is electrically conductive. This compound is called a conductor and of the many types of known conductors, synthetic graphite is preferably used in the cells of this invention. Synthetic graphite is readily commercially available. One source is Lonza Ltd., a Swiss company. The cathode can further comprise a binder. Examples of suitable binders include polytetrafluoroethylene and polyethylene.

The cathodes comprise a major amount of the metal oxide, a conductive amount of the graphite and often an effective amount of binder. Typically, the metal oxide will comprise between and about 80 to about 85 weight percent of the total cathode weight. When a binder is employed, the binder will comprise less than about 0.5% by weight. The remainder of the cathode will be comprised of graphite and electrolyte solution. The amount of the electrolyte solution is sufficient to wet the dry components, and to provide a mixture that can be molded. The cathodes are prepared by mixing the components together and dispensing the mix into the container. The mix is then molded or compressed against the inside of the container.

Zinc is used as the active anode material in the cells of this invention. Preferably, the zinc is low gassing zinc, and is in powder form. The powdered zinc is combined with a binder, optional additives, and an amount of the electrolyte solution to form a gel. The anode gel generally expands when it is discharged. Optional additives would include indium, bismuth, lead or gallium. These additives could further reduce gassing due to the zinc.

EXAMPLE 1

Several AA size alkaline cells were made using a cathode mixture of electrolyte manganese dioxide, graphite, binder and aqueous potassium hydroxide; a separator of cellophane; and an anode gel comprising a mixture of aqueous potassium hydroxide, binder and powdered amalgamated alloyed zinc. Each of the cells contained no mercury and had a different additive included with the zinc. Identical cells were made but without the brass anode current collector. The gas generated in each cell was measured and the increase in gassing of the cells containing the brass anode current collector was calculated.

The data obtained are shown in Table 1 in which EO is a polyoxyethylene having the formula $(CH_2CH_2O)$.

TABLE 1

| Additive to Anode | | Increase in Gassing from Brass Collector |
|---|---|---|
| EO Glycol $[HO(EO)_nOH]$ | $n = 9$ | 67% |
| Alkyl EO Ether $[HO(EO)_n(CH_2)_{(m-1)}CH_3]$ | $n = 8, m = 13$ | 67% |
| Alkyl EO Acid $[HOOCH_2O(EO)_n(CH_2)_{(m-1)}CH_3]$ | $n = 8, m = 6$ | 67% |
| Alkyl EO Acid | $n = 9, m = 12$ | 95% |
| Alkyl EO Ether $[HO(EO)_n(CH_2)_{(m-1)}CH_3]$ | $n = 8, m = 1$ | 126% |
| EO Diacid $[HOOC(EO)_nCOOH]$ | $n = 14$ | 183% |

In the above cells, the increase in gassing was due to the brass anode current collector and not from the zinc. Similar made cells, except that the additive was changed, were tested and the amount of gassing due to both the zinc and brass collector was measured. The data obtained are shown in Table 2.

TABLE 2

| Additive to Anode | Increase in Gassing from Zinc + Brass Collector |
|---|---|
| Alkyl EO Sulfate $HO3\ (EO)_n(CH_2)_{(m-1)}CH_3]$ | 283% |
| Alkyl EO Amine $H2N\ (EO)_n(CH_2)_{(m-1)}CH_3]$ | about 750% |

EXAMPLE 2

Additional alkaline cells were made as above but with different phosphate ester additives of the formula presented above. The additives had different n and m numbers and monoester to diester ratios, cells were made except that they did not contain a brass anode current collector. The increase in gassing of the cells containing the brass anode current collector over the cells that did not contain the brass anode current collector was calculated and the data are shown in Table 3.

TABLE 3

| *M/D Ratio | n | m | Increase in Gassing from Brass Collector |
|---|---|---|---|
| OK | OK | OK | 0.0% |
| >9 | 3 | OK | |
| OK | LOW | OK | 50.01% |
| >9 | 2 | 13 | |
| OK | LOW | LOW | 250.0% |
| >9 | 0 | 1 | |
| OK | HIGH | OK | 83.3% |
| >9 | 4 | 13 | |
| >9 | 5 | 13 | 50.0% |
| OK | HIGH | HIGH | 100.0% |
| >9 | 7 | 14 | |
| LOW | OK | LOW | 113.3% |
| < | 3 | 8 | |
| LOW | OK | HIGH | 100.0% |
| <9 | 3 | 18 | |
| LOW | LOW | OK | 66.7% |
| <9 | 1 | 13 | |
| LOW | HIGH | OK | 75% |
| <9 | 5 | 13 | |
| <9 | 6 | 13 | 83.3% |
| <9 | 7 | 13 | 100.0% |
| LOW | HIGH | LOW | 300.0% |
| <9 | 6 | 11 | |
| <9 | 6 | 12 | 166.7% |
| LOW | HIGH | HIGH | 200.0% |
| <9 | 5 | 18 | |

TABLE 3-continued

| *M/D Ratio | n | m | Increase in Gassing from Brass Collector |
|---|---|---|---|
| NONE 0 | OK 3 | LOW 9 | 83.3% |
| NONE 0 | HIGH 8 | LOW 11 | 50.0% |
| LOW | HIGH | ARYL | |
| <9 | 4 | Aryl | 58.3% |
| <9 | 9 | Aryl | 266.7% |
| <( | 6 | Aryl | 616.7% |

*M = monoester, D = diester

As can be seen from the data in Table 3, the preferred phosphate ester is one having a monoester to diester ratio of greater than 9, n=3 and m=13. Deviation from the preferred phosphate ester leads to gassing from the brass anode current collector as shown in the data presented in Table 3. It was also observed during the test that a suitable separator would be cellophane.

Though the invention has been described with respect to preferred embodiments thereof, many variations and modifications will become apparent to those skilled in the art. It is therefore the intention that the appended claims be interpreted as broadly as possible in view of the prior art to include all such variations and modifications. Example of such variations is in the use of additional additions such as indium, bismuth, and lead as discussed above.

What is claimed:

1. A galvanic cell comprising a conductive container; a cathode electrode in electronic contact with the container and said container functioning as a first terminal of the cell; a conductive cover for the container functioning as a second terminal of the cell; a separator disposed within said cathode electrode to form a cavity within said cathode electrode, said separator permitting ion transport; a zinc-containing anode electrode disposed within said cavity and electronically insulated from the cathode electrode by said separator; an electrolyte; a brass anode current collector in electronic contact with said anode electrode and in electronic contact to the second terminal of the cell and wherein said cell contains a phosphate ester having the formula:

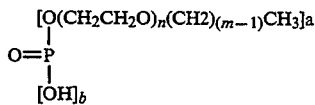

wherein b is greater than 1.9;
a+b=3;
n is 3;
m is 13;
and the ratio of the monoester component of the phosphate ester to the diester component of the phosphate ester is greater than 9.

2. The galvanic cell of claim 1 wherein said cell is an alkaline cell and said cathode electrode comprises manganese dioxide.

3. The galvanic cell of claim 2 wherein said phosphate ester is present in the cell in an amount from 0.001 to 1.0 weight percent based on the weight of the zinc.

4. The galvanic cell of claim 2 wherein said phosphate ester is present in the cell in an amount from 0.01 to 0.2 weight percent based on the weight of the zinc.

5. The galvanic cell of claim 2 wherein the cell further includes indium in an amount between about 0.001 and 1.0 weight percent based on the weight of the zinc.

6. The galvanic cell of claim 2 wherein the cell further includes bismuth in an amount between about 0.001 and 1.0 weight percent based on the weight of the zinc.

7. The galvanic cell of claim 2 wherein the separator is made of cellophane.

8. The galvanic cell of claim 7 wherein said phosphate ester is present in the cell in an amount from 0.01 to 0.2 weight percent based on the weight of the zinc.

9. The galvanic cell of claim 8 wherein the cell further includes indium in an amount between about 0.001 and 1.0 weight percent based on the weight of the zinc.

10. The galvanic cell of claim 8 wherein the cell further includes bismuth in an amount between about 0.001 and 1.0 weight percent based on the weight of the zinc.

11. The galvanic cell of claim 9 wherein said electrolyte is potassium hydroxide.

12. The galvanic cell of claim 11 wherein said phosphate ester is present in the cell in an amount from 0.01 to 0.2 weight percent based on the weight of the zinc.

13. The galvanic cell of claim 12 wherein the cell further includes indium in an amount between about 0.001 and 1.0 weight percent based on the weight of the zinc.

14. The galvanic cell of claim 12 wherein the cell further includes bismuth in an amount between about 0.001 and 1.0 weight percent based on the weight of the zinc.

15. The galvanic cell of claim 2 wherein said cell contains no mercury.

16. The galvanic cell of claim 11 wherein said cell contains no mercury.

17. The galvanic cell of claim 16 wherein said phosphate ester is present in an amount from 0.001 to 1.0 weight percent of the zinc.

18. The galvanic cell of claim 17 wherein said phosphate ester is present in an amount from 0.01 to 0.2 weight percent of the zinc.

19. The galvanic cell of claim 18 wherein the cell further includes indium in an amount between about 0.001 and 1.0 weight percent based on the weight of the zinc.

20. The galvanic cell of claim 18 wherein the cell further includes bismuth in an amount between about 0.001 and 1.0 based on the weight of the zinc.

* * * * *